United States Patent [19]

Solé

[11] Patent Number: 4,921,709
[45] Date of Patent: May 1, 1990

[54] BANANA PEEL PROCESSING

[75] Inventor: Pedro Solé, Cincinnati, Ohio

[73] Assignee: Chiquita Brands, Inc., Cincinnati, Ohio

[21] Appl. No.: 405,143

[22] Filed: Sep. 7, 1989

Related U.S. Application Data

[63] Continuation-in-part of Ser. No. 128,633, Dec. 4, 1987, Pat. No. 4,874,617.

[51] Int. Cl.$^5$ .................................. A23L 2/02
[52] U.S. Cl. ................................. 426/49; 426/330.5; 426/492
[58] Field of Search ............. 426/615, 49, 312, 330.5, 426/534, 492, 493, 494, 50, 599

[56] References Cited

U.S. PATENT DOCUMENTS

| | | | |
|---|---|---|---|
| 1,053,955 | 2/1913 | Plunkett | 426/615 |
| 1,138,888 | 5/1915 | Plunkett | 426/615 |
| 2,192,273 | 3/1940 | Rey | 426/615 |
| 2,513,813 | 7/1950 | Milleville | 99/205 |
| 2,647,838 | 8/1953 | Stone | 426/615 |
| 2,714,573 | 8/1955 | Fessler | 202/39 |
| 3,087,822 | 4/1963 | Smith et al. | 99/155 |
| 3,223,533 | 12/1965 | Kelly | 99/140 |
| 3,223,534 | 12/1965 | Kelly | 99/140 |
| 3,248,233 | 4/1966 | Brent et al. | 99/205 |
| 3,544,337 | 12/1970 | Bundus | 426/658 |
| 3,869,557 | 3/1975 | Vrespa | 426/524 |
| 4,273,792 | 6/1981 | Johnson et al. | 426/510 |
| 4,447,530 | 5/1984 | Young | 426/52 |

FOREIGN PATENT DOCUMENTS

| | | |
|---|---|---|
| 698598 | 12/1964 | Canada . |
| 982715 | 2/1965 | United Kingdom . |

OTHER PUBLICATIONS

Bomben et al., Food Technol., "Vacuum stripping of aromas", 20:125 (1966).
Claffey et al., USDA/ARS, "An improved experimental unit for recovery of volatile flavors", 73:19.
Dimick et al., Ind. Eng. Chem., "A laboratory continuous distillation column", 44:2487 (1952).
Eisenhardt et al., USDA/ARS, "Frozen high-density fresh flavor peach concentrate by a continuous process", 73:21 (1958).
Eskew, In: Chemistry of Natural Food Flavors, a Symposium, "Preparation and applications of flavor concentrates from deciduous fruits", p. 113, (5/57).
Eskew et al., Food Engin., "Concentrates, strips flavor in 1 pass without vacuum", 31:70 (1/59).
Eskew et al., USDA/AIC, "Preparation of full-flavor grape juice concentrates", 301.
Eskew et al., USDA/AIC, "High density full-flavor grape juice concentrate", 342.
Eskew et al., USDA/AIC, "High density full-flavor apple juice concentrate", 315.
Leveringon et al., Queensland J. of Agricul. Sci., "An experimental pineapple juice concentrate plant incorporating flavor recovery", 21:33, (1964).
Martel, Ind. Aliment. Agric. (Paris), "Industrial techniques for recovering fruit aromas–1st part", 87:1069, (1970).
Martel, Ind. Aliment. Agric. (Paris), "Industrial techniques for recovering fruit aromas", 88:683, (1971).
Milleville et al., USDA/AIC, "Recovery and utilization of natural apple flavors", 63, (1944).
Morgan et al., Food Technol., "Studies on the recovery of essence from Florida orange juices", 7:332, (1953).
Mottern, The Fruit Prod. J. and Am. Vinegar Indus., "Concentrated apple juice", p. 68 (11/37).
Phillips et al., Food Technol., "Recovery of fruit essences in preserve manufacture", 6:210, (1952).
Roger, Food Technol., "The recovery of methyl anthranilate in Concord grape essence", 15:309, (1961).
Roger et al., Food Technol., "Designing distillation equipment for volatile fruit aromas", 19:69, (1965).

(List continued on next page.)

Primary Examiner—Carolyn Paden
Attorney, Agent, or Firm—Fish & Richardson

[57] ABSTRACT

A process for obtaining banana peel essences and juice from banana peels removed by hand from whole ripe bananas.

13 Claims, 7 Drawing Sheets

OTHER PUBLICATIONS

Sulc, Confructa Studien, "Frunchtasaftkonzentrierung und fruchtaromaseparierung", 28:258, (1984).

Walker, Volatile Flavor Recovery, "Fruit and vegetable juice processing technology", pp. 358–370 (1961).

Walker et al., Food Technol., "Preparation of a frozen apple juice concentrate" 5:148, (1951).

Walker et al., Food Technol., "A laboratory fruit essence recovery unit", 9:87, (1955).

Drawert et al., Biogenesis of Aroma Compounds in Plants and Fruits, "Effect of particle size on aroma biosynthesis in fruit tissue", 176:275, (1983).

Issenberg et al., Agric. Food Chem., "Volatile components of bananas", 11:2, (1963).

Labows et al., Am. Lab., "Direct analysis of food aromas", 15:56, (1983).

McCarthy et al., Proceedings First International Congress Food Sci. and Technol., "Correlation of gas chromatographic data with flavor profiles of fresh banana fruit", p. 379, (1962).

Moshonas et al., J. Agric. Food Chem. "Direct gas chromactographic analysis of aqueous citrus and other fruit essences", 32:526, (1984).

Anon, Fluessiges Obst, "Nueue aromarueckgewinnungs- und endampfanlage fuer fruchtmark in meran", 43:162 (1976).

Bomben et al., Fruchtsaft-Industrie, "Operating conditions for aroma recovery by new vacuum stripping method and evaluation of aroma solutions", 12:44, (1967).

Eskew et al, Ind. Eng. Chem., "Frozen concentrated apple juice", 43:2397, (1951).

Phillips et al., Ind. Eng. Chem. "Experimental unit for recovery of volatile flavors", 43:1672, (1951).

Samsonova et al., Ovoshchesushil Noi Promyshlennosti, "Recovery of aromatic substances during manufacture of stewed fruit and jam", 14:18, (1971).

Wolford et al., 17th Ann. Citrus Processores Meeting, Lake Alfred, FL., 10/4, "A vacuum system for removal and concentration of citrus juice essences,-general description and operational data", (1966).

Wolford et al., FL Citrus Commission Report, "Recovered volatiles from citrus juices", (1966).

Dimitriou, "New evaporator type for the fruit juice industry", pp. 3–11, (1984).

Milout-Haifa Bay Settlement Development Co. promotional and advertising literature.

Brown, product literature.

Baader, product literature.

Beehive Machinery, Inc., product literature.

Anon, Industrielle Obst-und Gemueseverwertung, "Aromarueckgewinnungs–und eindampfanlage fuer furchtmark", 61:545, (1976).

Merory 1960 *Food Flavorings*, Composition Manufacture and Use, Avi Publishing Company, Inc., Westport CT, pp. 63–65.

Enzyme Topics No. 3, May 1964, Rohm & Haas Company, Philadelphia, PA, p. 1.

CA 77(3) 18149e.

CA 103(9) 70011y.

CA 103(21) 177203q.

CA 103(23) 195166j.

Viquez, *J. of Food Technology* (1981) 16:115–125.

Munyanganizi, *Ind. Alimen. Agric.* 93(6) 707–711.

Bannar, "All-Natural Banana Essence", 1980 Food Engineering 52(11) p. 23.

GI: GLYCOL INLET
GR: GLYCOL RETURN

BANANA PEEL PROCESSING

BACKGROUND OF THE INVENTION

This application is a continuation-in-part of U.S. Ser. No. 128,633, filed Dec. 4, 1987, now U.S. Pat. No. 4,874,617.

The invention relates to a method for obtaining banana essences and juice or syrup from bananas.

Ripe bananas consist of a pulp enclosed within a peel. The pulp includes water, sugars, cellulosic constituents, residual starch, and flavor and aroma components which include, in general, a variety of alcohols, aldehydes, esters, and ketones. The peel of a ripe banana consists of an outer epidermis, a yellow-colored layer (chlorenchyma) and a white inner layer (parenchyma), including the white fibrils that cling to the peel and pulp (banana rag). Mixtures of aroma components in a solvent, essentially free of sugars and other solid constituents, are known as banana essences.

It is known that banana essences can be obtained from ripened bananas, after the peels are manually removed and discarded, by homogenizing the pulp and recovering volatile components from the homogenized pulp by drawing off the volatile components under vacuum. It is also known that banana juice or syrup can be obtained from ripened bananas, after the peels are manually removed and discarded, by homogenizing the pulp, digesting the homogenized pulp with an enzyme to cause the pulp to evolve into a solid and a liquid portion (the banana juice), and separating the liquid portion from the solid portion.

The banana peels, which constitute up to about 35 percent of the whole banana weight, are typically discarded, or may be used as cattle feed.

SUMMARY OF THE INVENTION

According to one aspect of the invention, a process for obtaining banana peel essence from a banana comprises providing whole, ripe bananas, each banana comprising a banana pulp and, disposed about the banana pulp, a banana peel; peeling the banana by hand to remove the pulp from within the peel, the peel comprising an outer epidermis, a chlorenchyma, and banana peel parenchyma; separating the peel parenchyma from the chlorenchyma and outer epidermis by means of a mechanical processing device; digesting the parenchyma with an enzyme to cause the parenchyma to evolve into liquid and solid portions; and, during digestion, recovering, by suction and condensation, from the parenchyma, volatile components comprising banana essence from the banana peels.

In preferred embodiments of this aspect of the invention, the mechanical processing device (with addition of water if needed) separates the parenchyma from the chlorenchyma and outer epidermis, the parenchyma is digested with the enzyme, and the volatile components are recovered by vacuum deaeration and condensation from the parenchyma.

According to another aspect of the invention, a process for obtaining a banana peel essence from a banana comprises providing whole, ripe bananas, each banana comprising a banana pulp and, disposed about the pulp, a banana peel; peeling the banana by hand to remove the banana pulp from within the banana peel, the peel comprising an outer epidermis, a chlorenchyma, and banana peel parenchyma; separating the parenchyma from the chlorenchyma and outer epidermis by means of a mechanical processing device (adding water if needed); homogenizing the parenchyma; and, during homogenizing, recovering, by vacuum deaeration and condensation, from the parenchyma, volatile components comprising a banana essence.

According to another aspect of the invention, a process for obtaining banana peel syrup or juice from a banana comprises providing whole, ripe bananas, each banana comprising a banana pulp and, disposed about the pulp, a banana peel; peeling the banana by hand to remove the pulp from within the peel, the peel comprising an outer epidermis, a chlorenchyma, and banana peel parenchyma; placing a quantity of banana peels into a mechanical processing device; within the mechanical processing device, separating the parenchyma from the chlorenchyma and the outer epidermis (with addition of water if needed); digesting the parenchyma with an enzyme to cause the parenchyma to evolve into solid and liquid portions, the liquid portion comprising the banana peel syrup or juice (and water, when added); separating the liquid portion from the solid portion; and removing, by vacuum deaeration and evaporation, from the liquid portion, volatile components comprising a banana peel essence and water, thereby concentrating the liquid portion, the concentrated liquid portion comprising concentrated, de-flavored banana peel syrup or juice.

According to still another aspect of the invention, a process for obtaining banana peel syrup or juice from a banana comprises providing whole, ripe bananas, each banana comprising a banana pulp and, disposed about the pulp, a banana peel; peeling the banana by hand to remove the pulp from within the peel, the peel comprising an outer epidermis, a chlorenchyma, and banana peel parenchyma; placing a quantity of banana peels into a mechanical processing device; within the mechanical processing device, separating the parenchyma from the chlorenchyma and outer epidermis (with addition of water if needed); digesting the parenchyma with an enzyme to cause the parenchyma to evolve into solid and liquid portions, the liquid portion comprising banana peel syrup or juice (and water, when added); during digestion with the enzyme, removing, by suction and condensation, from the parenchyma, volatile components comprising a banana peel essence; and separating the liquid portion from the solid portion.

According to yet another aspect of the invention, a process for obtaining banana peel syrup or juice from a banana comprises providing whole, ripe bananas, each banana comprising a banana pulp and, disposed about the pulp, a banana peel; peeling the banana by hand to remove the pulp from within the peel, the peel comprising an outer epidermis, a chlorenchyma, and banana peel parenchyma; placing a quantity of banana peels into a mechanical processing device; within the mechanical processing device, separating the parenchyma from the chlorenchyma and outer epidermis (with addition of water if needed); homogenizing the parenchyma prior to digestion; during homogenizing, removing by vacuum deaeration and condensation, from the parenchyma, volatile components comprising a banana peel essence; digesting the parenchyma with an enzyme to cause the parenchyma to evolve into solid and liquid portions, the liquid portion comprising banana peel syrup or juice (and water, when added), and separating the liquid portion from the solid portion.

According to another aspect of the invention, a process for obtaining banana peel essence and banana peel syrup or juice from a banana comprises providing whole, ripe bananas, each banana comprising a banana pulp and, disposed about the pulp, a banana peel; peeling the banana by hand to remove the pulp from within the peel, the peel comprising an outer epidermis, a chlorenchyma, and banana peel parenchyma; placing a quantity of banana peels into a mechanical processing device; within the mechanical processing device, separating the parenchyma from the chlorenchyma and outer epidermis (with addition of water if needed); homogenizing the parenchyma; during homogenizing, recovering, by vacuum deaeration and condensation, from the parenchyma, volatile components comprising a first banana peel essence; digesting the parenchyma with an enzyme to cause the parenchyma to evolve into solid and liquid portions, the liquid portion comprising banana peel syrup or juice (and water, when added); separating the solid portion from the liquid portion; and, during digestion, recovering, by suction and condensation, from the parenchyma, volatile components, and removing, by vacuum evaporation, from the liquid portion, further volatile components comprising a second banana peel essence, removal of the further volatile components thereby concentrating the liquid portion, the concentrated liquid portion comprising concentrated banana peel juice or syrup.

Preferred embodiments of the process for obtaining banana peel juice or syrup may include the further step of fermenting the banana peel juice or syrup to produce alcohol or vinegar, or the further step of growing yeast employing the banana peel juice or syrup as a substrate.

In preferred embodiments of each of the above aspects of the invention, the parenchyma is separated from the outer epidermis and chlorenchyma by passing the banana peels through separation means comprising screens having openings that preclude the outer epidermis and chlorenchyma from passing through but allow the parenchyma to pass through, preferably the openings are 0.25 inch or less in diameter. Water may be added to facilitate flow, if required, in the separation process.

The use of a mechanical processing device provides a very efficient method of separating the outer epidermis and chlorenchyma from banana peel parenchyma. The device allows the parenchyma, which also contains banana essence and some amount of banana sugars in the form of a juice or dilute syrup, to be separated from the other peel components. The peel parenchyma generally constitutes about 65 to 80 percent of the weight of the banana peel, and accordingly, the recovery of the essences is high. Large quantities of banana peels are readily processed by the method of the invention, with a minimum of waste.

Recovering banana essences from the banana peels increases the total yield of banana essences. Moreover, each type of essence has its own distinct properties.

It is also possible, under circumstances making it feasible economically, to recover concentrated banana juice or syrup from the banana peels, according to the method. Also, this banana juice can be fermented to produce alcohol or vinegar, or used as a substrate to grow yeast.

Other features and advantages of the invention will be apparent from the following description of a presently preferred embodiment, and from the claims.

DESCRIPTION OF THE PREFERRED EMBODIMENT

The drawings are described first.

Figure 1:
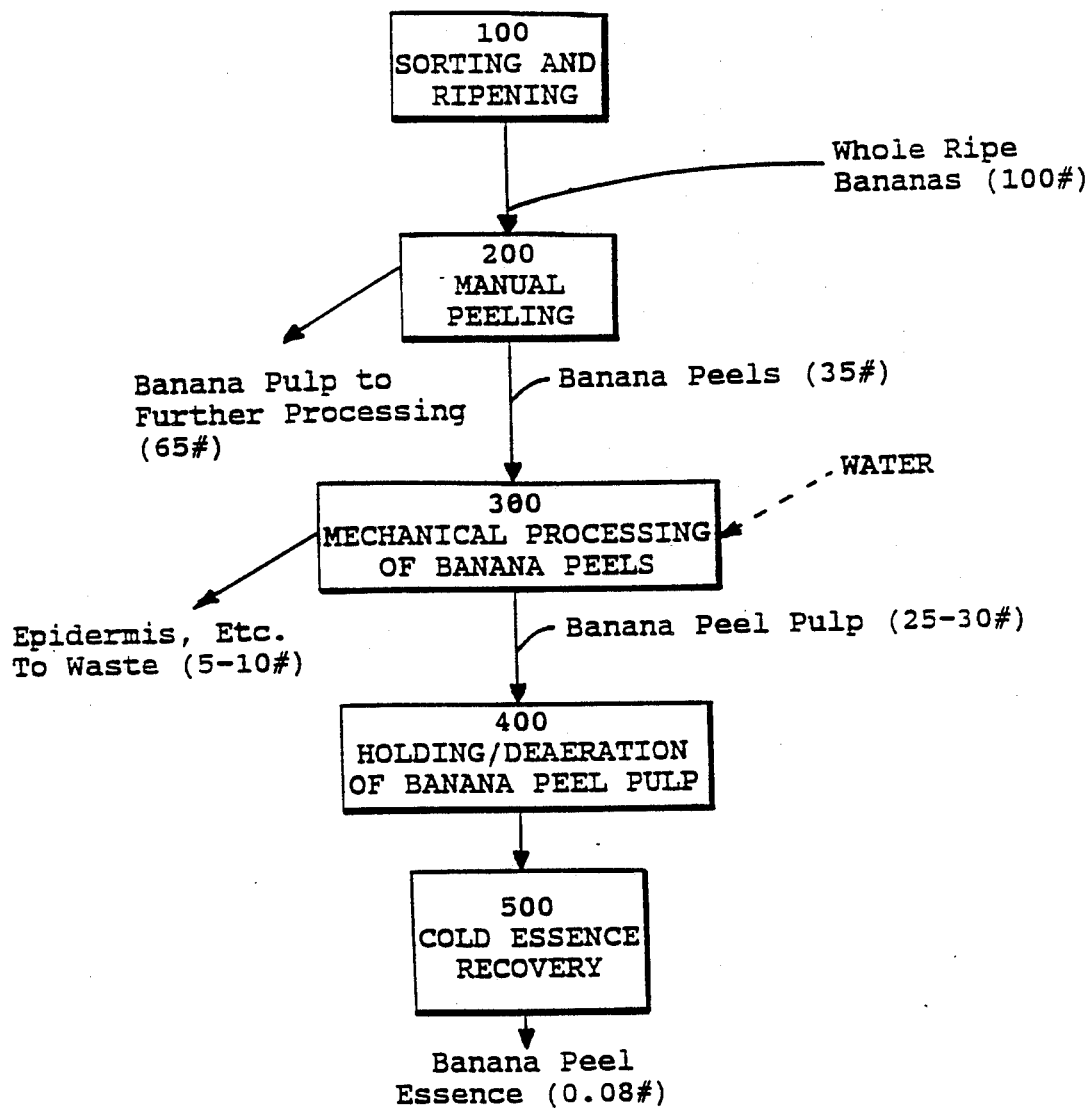
FIG. 1 is a block diagram of the steps in the processing of bananas for recovery of banana peel essence and banana peel juice.

Referring briefly to FIG. 1, the process steps of the invention for recovery of a banana peel essence are shown in a block diagram. Bananas are sorted and ripened (100). Selected bananas are peeled by hand (200). The banana pulp, constituting about 65 out of every 100 pounds of whole, ripe bananas, are removed for further processing. The banana peels, constituting about 35 of every 100 pounds of ripe bananas peeled by hand, are processed mechanically (300). Depending on the nature of the device employed, water my be added to facilitate flow. The banana peel parenchyma (about 25 to 30 pounds remain) from the peeling step (300) is homogenized and deaerated at a vacuum holding station (400), and a banana peel essence (about 0.08 pounds) is recovered from the volatile components by cold essence recovery (500). The outer epidermis, fibers and chlorenchyma of the peels from the mechanical processing step (about 5 to 10 pounds of the 35 pounds of banana peels remaining) are discarded as solid waste.

Figure 1A:
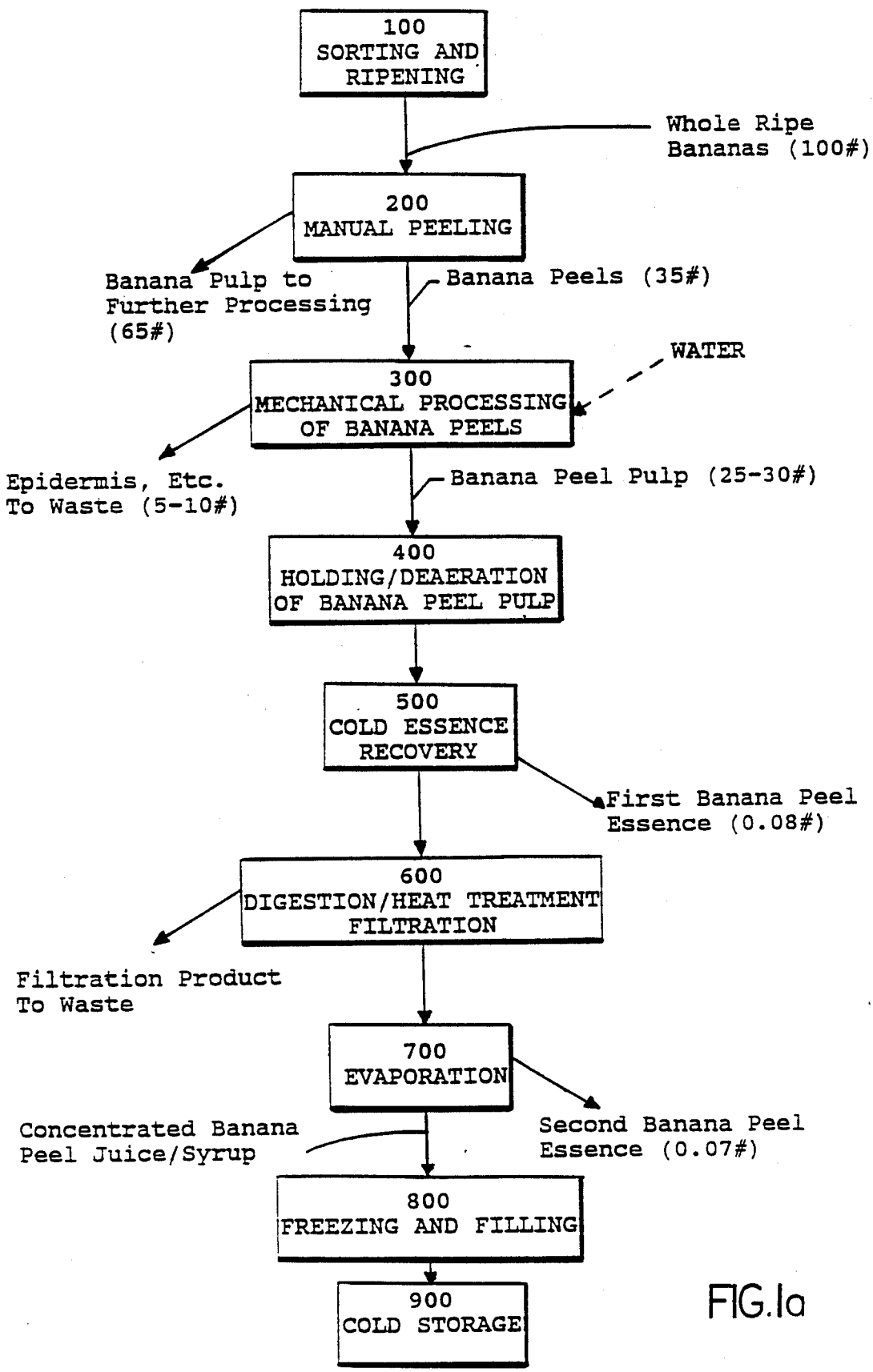

Referring to FIG. 1A, the process steps of another embodiment of the invention for recovering banana peel essences and recovering banana peel syrup or juice are shown in block diagram. The process proceeds as in FIG. 1 through the steps of homogenization and deaeration at the vacuum holding station (400) with a first banana peel essence (about 0.08 pounds) recovered from the volatile components by cold essence recovery (500). The homogenized banana peel parenchyma mixture from the vacuum holding station (400) is subjected to enzyme digestion and filtration (600). The remainder in subjected to evaporation (700) and a second banana essence (about 0.07 pounds) is recovered from the volatile components. The solid filtration waste products are discarded. The remainder, a concentrated banana peel juice or syrup, is collected and frozen (800) and stored (900) for future use.

More specifically, acceptable bananas are ripened (using ethylene gas to trigger the ripening) and stored under conventional temperature and air circulation conditions. The best yield of essences and juice is achieved from bananas ripened to have a peel color index of at least 5, more preferably of about 7. A peel color index of 5 means the peel is all yellow with some traces of green at the tips. A peel color index of 7 means the peel is completely yellowed and is covered with brown freckles.

The bananas are washed with fresh water, and moldy, overripe, or otherwise unacceptable bananas are removed. The bananas are then peeled by hand, and the banana pulps are removed for further processing, e.g. as described in Application Ser. No. 128,633, filed Dec. 4, 1987, the disclosure of which is incorporated herein by reference.

Figure 2:
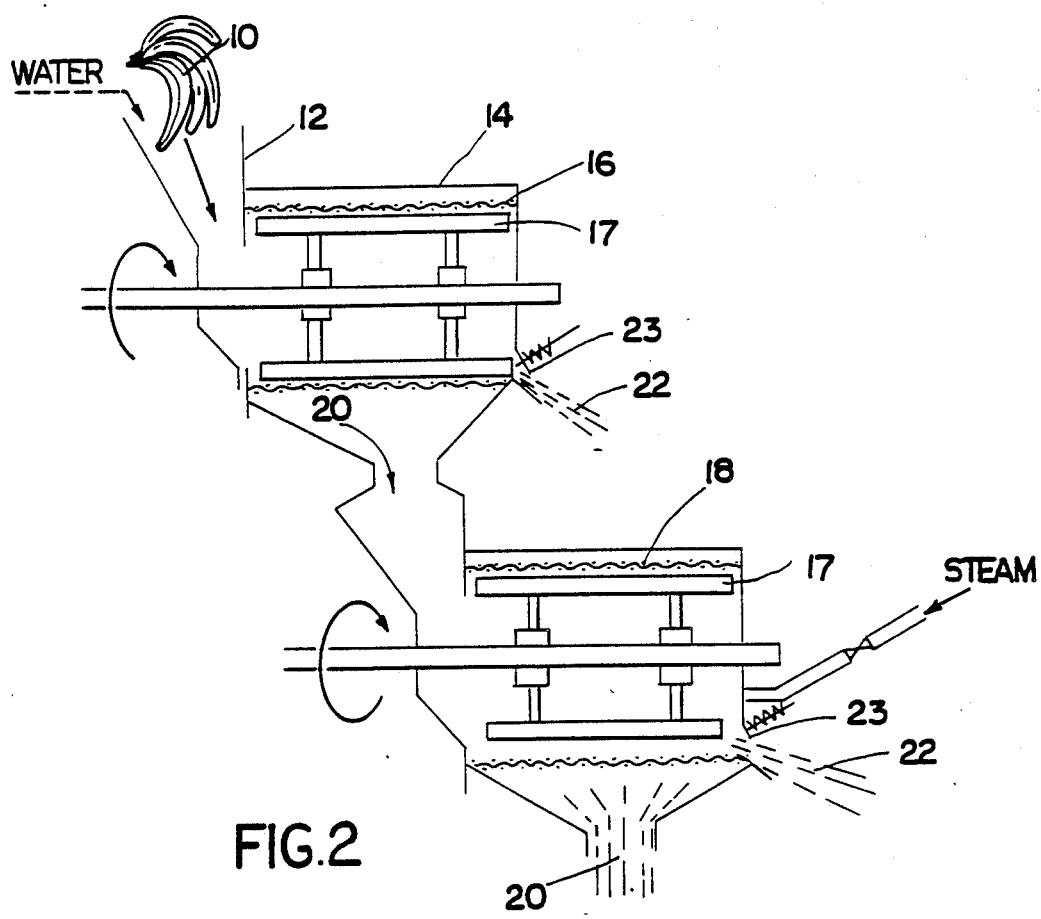
FIG. 2 is a sectional view of a pulper and a finisher used as a mechanical banana peel processor.

Referring to FIG. 2, the banana peels 10 are fed into the feeder hopper 12 of mechanical banana peel processing device 14. The device includes, in series, a screen 16 having 0.125 to 0.25 inch diameter openings and a screen 18 having 0.027 to 0.045 inch diameter openings. The rotating paddles or brushes 17 force a mixture 20 of the banana peel parenchyma through the screens, while the outer epidermis, fibers and chlorenchyma of the peels (mixture 22) and other wastes are carried along the screen to a discharge outlet 23. The process is preferably carried out under an atmosphere without oxygen (e.g., under steam) to avoid darkening that occurs when oxygen contacts the banana parenchyma in the presence of enzymes contained in the parenchyma. In this type of device, it may be necessary to add some water in order to facilitate the operation, and to avoid having the unit blocked by the banana peels.

Devices of the type shown in FIG. 2 are available, e.g., from FMC Corp. of Homer City, Pa. (Model No. 100), or from Brown Machine, of Beaverton, Mich.

Figure 3:
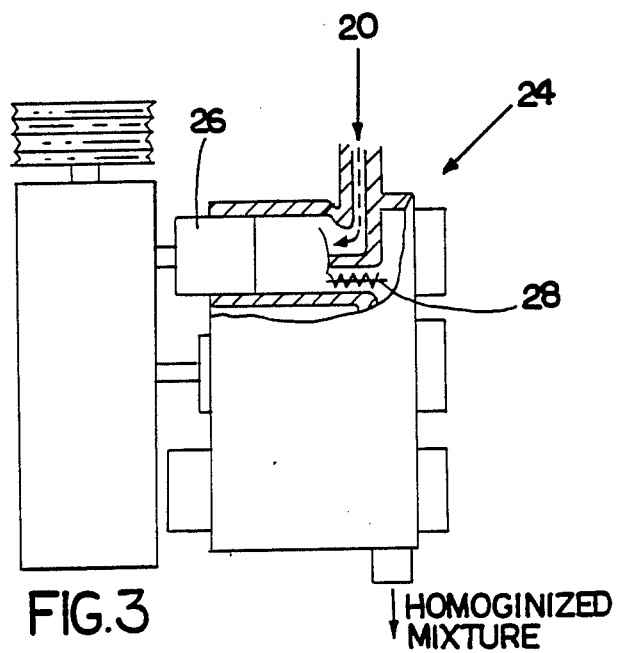
FIG. 3 is a partially sectional view of a homogenizer.

Referring to FIG. 3, the banana peel parenchyma (and water, if used) mixture 20 from the mechanical banana peel processing device is passed through a homogenizer 24. Pistons 26 homogenize the mixture 20 by forcing it through small openings 28, e.g., 0.125 inch diameter, at high pressure, e.g., 1,000 psi.

Figure 4:
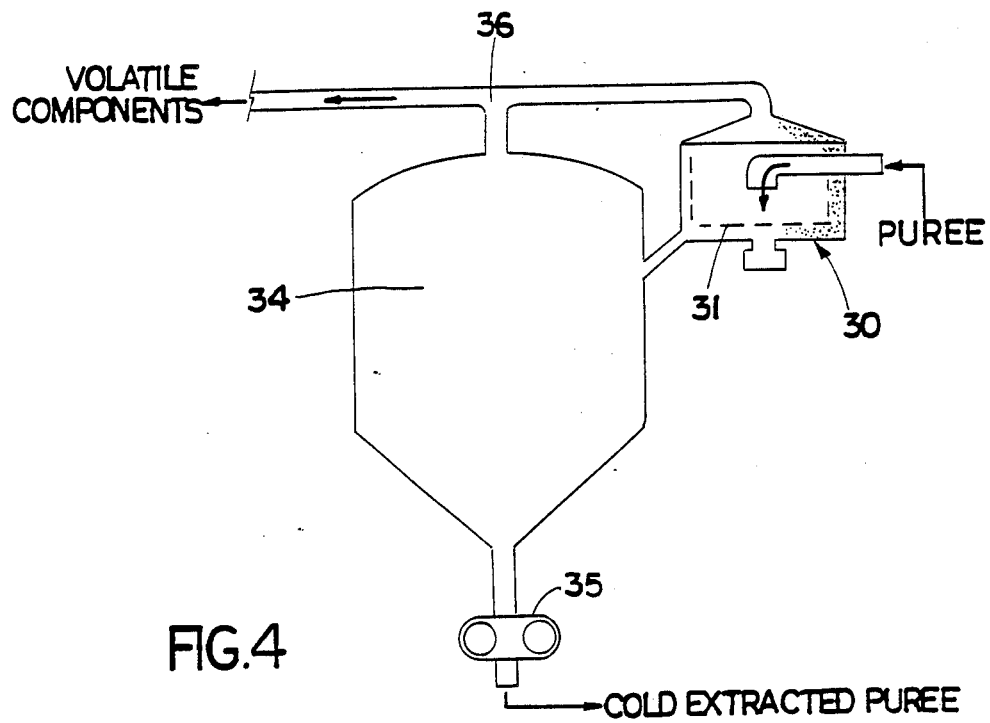
FIG. 4 is a sectional view of a deaerator and holding tank.

Referring to FIG. 4, the homogenized parenchyma mixture is next pumped into a perforated basket 31 within the chamber of a deaerator 30. A vacuum pump 32 (FIG. 5) maintains the pressure inside the deaerator below about 5 in. Hg. This low pressure is maintained in the holding tank as well. Rotation of basket 31 disperses the parenchyma mixture into fine particles as it is passed through the perforations to form a film along the walls of the internal surface of the deaerator. Volatile components, including flavor and aroma components, are drawn off through vacuum line 36. The deaerated parenchyma mixture then drops by gravity into vacuum holding tank 34, which is also connected to the pump 32 through line 36. Further volatile components are drawn off from the puree in the holding tank for about one half hour.

Figure 5:
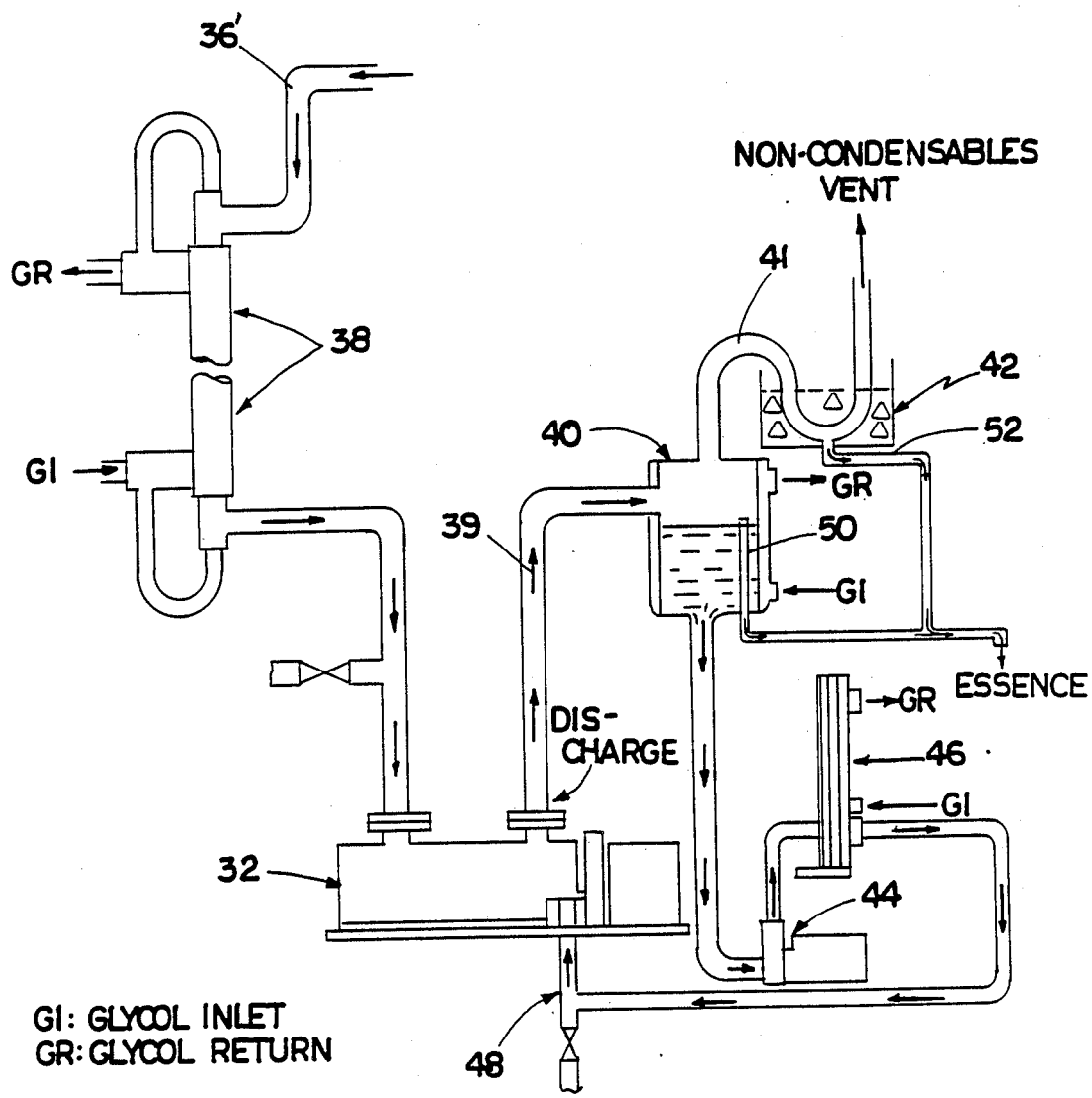
FIG. 5 is a perspective view, partially in section, of banana peel essence recovery apparatus.

Referring to FIG. 5, the pump 32 pulls the volatile components in the tube 36 through concentric tube heat exchanger 38. The exchanger 38 has three concentric tubes; a cooling fluid (e.g., a water and ethylene glycol mixture) circulates inside the innermost tube and between the two outer tubes. The volatile components flow through the exchanger and are partially condensed. The remaining vapors and the condensate flow into the pump 32, where they are brought into contact with a cold water/banana peel essence solution that is the working fluid of the vacuum pump. The essence present in the condensed vapors is absorbed by the working fluid. Uncondensed vapors and working fluid are pumped through the discharge tube 39 into the jacketed tank 40, which is also cooled by a circulating cooling fluid. The vapors separate from the water/essence, and a stream of the vapors pass through a tube 41 into an ice trap 42 to remove further traces of essence. The water/essence solution is recirculated, by means of a pump 44, through a plate heat exchanger 46, which is also cooled by a circulating cooling fluid. Finally the water/essence solution is recirculated to the pump 32 through the return line 48.

The condensation of the volatile components increases the volume of the water/essence solution in the system. After the volume reaches a previously determined level, the solution overflows into a collection tube 50 in the jacketed tank 40. An additional collection tube 52 in the tube 41 drains condensates in the tube 41 into the collection tube 50. The product that flows from the tube 50 is a quality banana peel essence.

The homogenized, deaerated banana peel parenchyma mixture may be discarded, or if desired, e.g. where economically feasible, the parenchyma mixture may be processed further to obtain a banana peel syrup or juice and a second (lower quality) banana peel essence, as described briefly above with reference to FIG. 1A.

Figure 6:
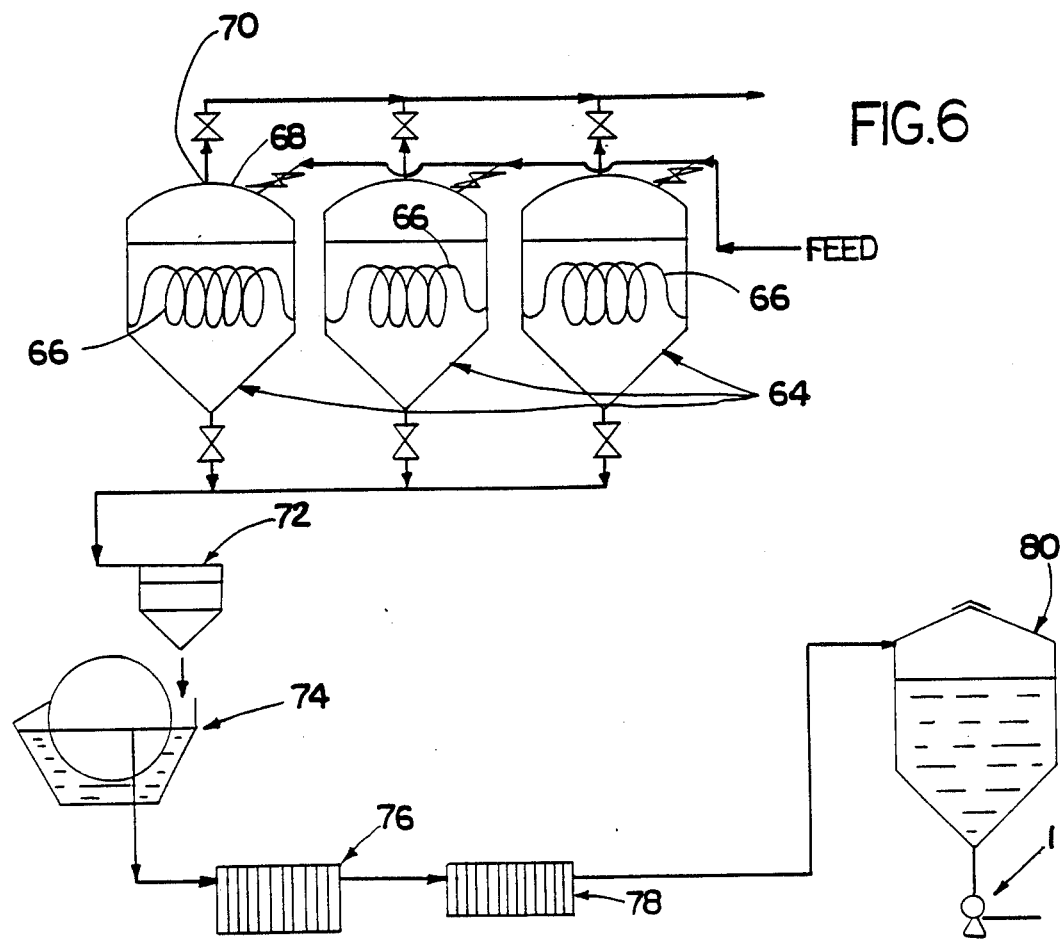
FIG. 6 is a perspective view, partially in section, of an apparatus for enzyme digestion of banana peel parenchyma.

To obtain a banana peel syrup or juice product, the deaerated banana parenchyma (and water, if added) mixture is drawn off from the bottom of the tank 34 (FIG. 4) by means of a pump (35), and is fed to one of several digestion tanks 64 (FIG. 6) to be treated with a pectinase (e.g., CLAREX L, a trademark of Miles Laboratories, Inc.) to facilitate the separation of the solid portion of the parenchyma mixture from the liquid portion (banana juice). Tanks 64 are equipped with rotary coils 66 to adjust the temperature inside the vat to the optimum for the activity of the enzyme. Tanks 64 also are fitted with covers 68 and venting means 70.

Typically, the digestion is carried out at 120° F. for 2 hours, at which time the digested parenchyma mixture is passed from the tanks through a screw press 72 to remove the bulk of the banana juice. The cloudy juice from the screw press passes to a rotary vacuum filter 74 that has been precoated with diatomaceous earth (the earth suspension tank, agitator, and pump are not shown). The de-flavored banana syrup or juice from the filter 74 is passed through a plate heat exchanger 76 for coagulation of any proteins present. The pasteurized syrup or juice is passed through a polishing filter 78 and finally to a surge tank 80.

Figure 7:
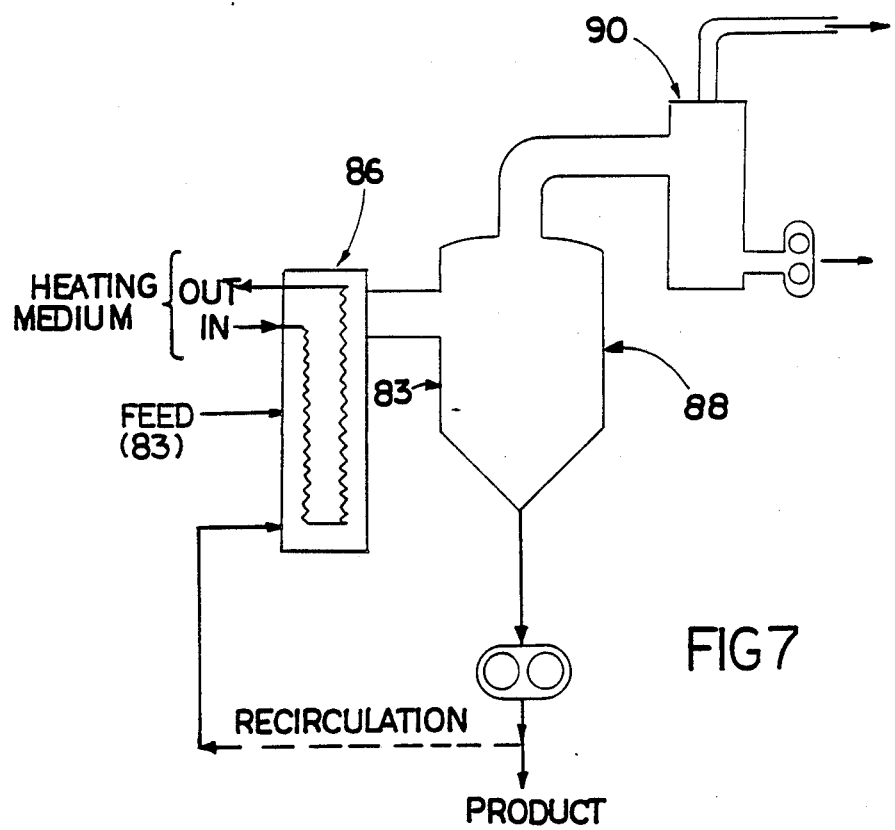
FIG. 7 is a sectional view of an apparatus for concentrating banana peel syrup or juice.

Referring to FIG. 7, the clarified banana syrup or juice enters (83) from surge tank 80 is fed to an evaporator consisting of a plate heat exchanger 86 and an evaporator body 88. The more volatile components of the juice, plus a substantial portion of the water, are vaporized and flow to a partial condenser 90, which condenses most of the water vapor while not condensing the more volatile components that include a second banana peel essence.

Figure 8:
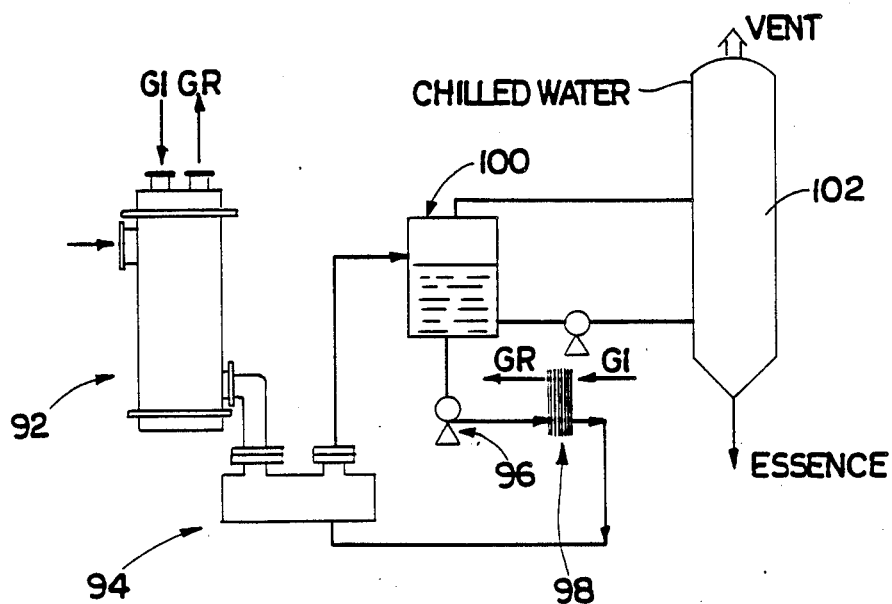
FIG. 8 is an apparatus for recovering banana peel essences.

Referring to FIG. 8, vapors from vents 70 of digestion tanks 64 and vapors from the condenser 90 are fed to a second condenser 92, which is cooled with a water-glycol mixture. Condensates and remaining vapors are drawn into a liquid ring vacuum pump 94, whose working fluid is a water/banana essence mixture. A pump 96 forces the working fluid to flow through a plate heat exchanger 98 and through the pump 94. The discharge from the pump 94 passes to a liquid-vapor separator 100. The vapor stream from the separator is fed to a scrubber 102, where the vapors are scrubbed with chilled water and vented. When a sufficient quantity of the second banana peel essence has collected in the working fluid, the liquid in the separator is pumped to the bottom of the scrubber and collected, mixed with the scrubbing water, as a second banana peel essence product.

Figure 9:
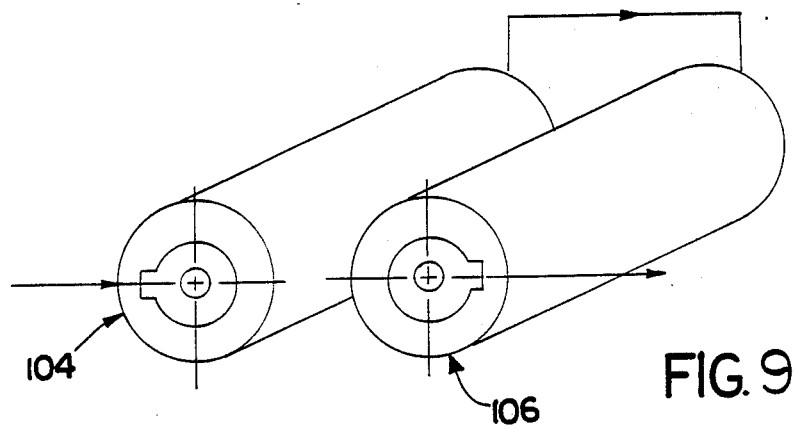
FIG. 9 is a perspective view of a banana syrup or juice chilling apparatus.

Referring to FIG. 9, the concentrated, de-flavored banana peel syrup or juice pumped from the bottom of evaporator body 88 is passed through a glycol-cooled swept surface exchanger 104 and then through an ammonia-cooled swept surface exchanger 106, where the juice is cooled to a temperature of 32° to 40° F.

Other Embodiments

Figure 10A:
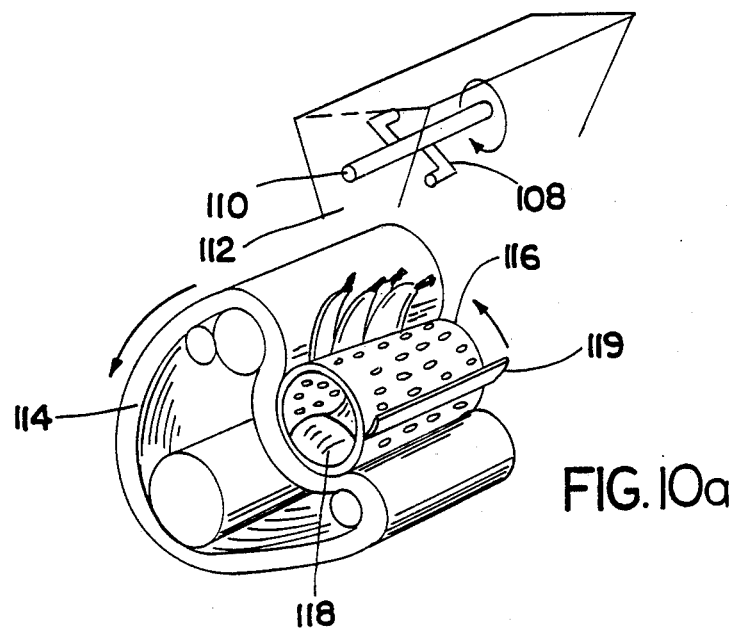
FIGS. 10A and 10B are sectional views of alternate embodiments of mechanical banana peel processors.

Other embodiments are within the following claims. For example, other mechanical banana peel processing devices can be used. One such device is shown in FIG. 10A. In using the device, banana peels are fed to the machine. Prebreaker fingers 108 mounted in a slowly rotating axis 110 prevent the bridging of the peels in the throat 112 of the device. The peels fall into a space formed between a strong but flexible belt 114 and a perforated drum 116 having 3 to 5 mm diameter openings. As the drum rotates, the belt forces the banana peel parenchyma through the perforations into the drum 116. The mixture is removed by a stationary hanger 118. The outer epidermis and chlorenchyma of the peels and the end material of the bananas remain adhered to the outside of the drum to be scraped off by a knife. A device 106 is available from, e.g., Baader, of West Germany (Model No. 896).

Figure 10B:
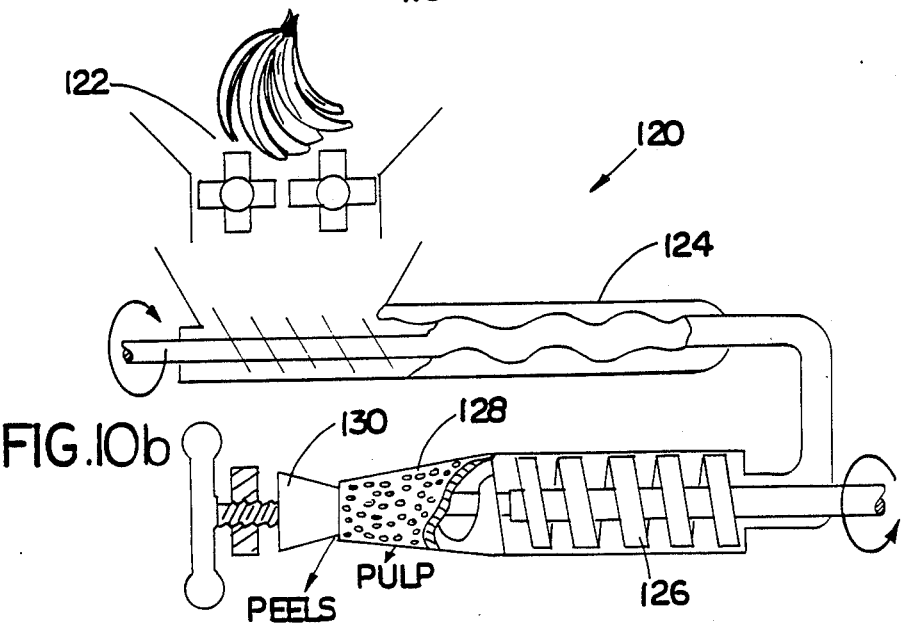

In a second alternative banana peel processing device 120, shown in FIG. 10B, banana peels are fed to a breaking mechanism 122, then, by positive displacement pump 124, e.g., a MOYNO ® pump from Robbins & Myers, Inc. of Springfield, Ohio, to an extruding-type screw conveyor 126. This conveyor operates inside a tapered cone 128 provided with a multiplicity of small (0.5 mm) holes. The parenchyma of the banana peels is forced through the holes in the cone to the outside. The outer epidermis and chlorenchyma of the peels travel to the end of the cone and are discarded against an inverted back-pressure cone 130 which can be adjusted to vary the pressure inside the perforated cone. A device 120 is available, e.g., from Beehive Machinery, Inc. (RSTD-06 Food Processing Machine).

What is claimed is:

1. A process for obtaining banana peel essence from a banana, said method comprising:
    providing whole, ripe bananas, each said banana comprising a banana pulp and, disposed about said banana pulp, a banana peel;
    peeling said banana by hand to remove said banana pulp from within said banana peel, said banana peel comprising an outer epidermis, a chlorenchyma, and banana peel parenchyma;
    separating said banana peel parenchyma from said chlorenchyma and said outer epidermis by means of a mechanical processing device;
    digesting said banana peel parenchyma with an enzyme to cause said parenchyma to evolve into a liquid portion and a solid portion; and,
    during said digestion, recovering, by suction and condensation, from said banana peel parenchyma, volatile components comprising said banana essence from said banana peels.

2. The process of claim 1, wherein said mechanical processing device separates said banana peel parenchyma from said chlorenchyma and said outer epidermis, said parenchyma is digested with said enzyme, and said volatile components are recovered by vacuum deaeration and condensation from said parenchyma.

3. A process for obtaining a banana peel essence from a banana, said method comprising
    providing whole, ripe bananas, each said banana comprising a banana pulp and, disposed about said banana pulp, a banana peel;
    peeling said banana by hand to remove said banana pulp from within said banana peel, said banana peel comprising an outer epidermis, a chlorenchyma, and banana peel parenchyma;
    separating said banana peel parenchyma from said chlorenchyma and said outer epidermis by means of a mechanical processing device;
    homogenizing said banana peel parenchyma; and,
    during said homogenizing, recovering, by vacuum deaeration and condensation, from said parenchyma, volatile components comprising a banana essence.

4. A process for obtaining concentrated banana peel juice or syrup from a banana, said method comprising
    providing whole, ripe bananas, each said banana comprising a banana pulp and, disposed about said banana pulp, a banana peel;
    peeling said banana by hand to remove said banana pulp from within said banana peel, said banana peel comprising an outer epidermis, a chlorenchyma, and banana peel parenchyma;
    placing a quantity of said banana peels into a mechanical processing device;
    within said mechanical processing device, separating said banana peel parenchyma from said chlorenchyma and said outer epidermis;
    digesting said banana peel parenchyma with an enzyme to cause said banana peel parenchyma to evolve into a solid portion and a liquid portion, said liquid portion comprising said banana peel syrup or juice;
    separating said liquid portion from said solid portion; and
    removing, by vacuum deaeration and evaporation, from said liquid portion, volatile components comprising a banana peel essence and water, thereby concentrating said liquid portion, said concentrated liquid portion comprising concentrated, de-flavored banana peel juice or syrup.

5. A process for obtaining banana peel syrup or juice from a banana, said method comprising
    providing whole, ripe bananas, each said banana comprising a banana pulp and, disposed about said banana pulp, a banana peel;
    peeling said banana by hand to remove said banana pulp from within said banana peel, said banana peel comprising an outer epidermis, a chlorenchyma, and banana peel parenchyma;
    placing a quantity of said banana peels into a mechanical processing device;
    within said mechanical processing device, separating said banana peel parenchyma from said chlorenchyma and said outer epidermis;
    digesting said parenchyma with an enzyme to cause said banana peel parenchyma to evolve into a solid portion and a liquid portion, said liquid portion comprising said banana peel syrup or juice;
    during said digestion with said enzyme, removing, by suction and condensation, from said banana peel parenchyma, volatile components comprising a banana peel essence; and separating said liquid portion from said solid portion.

6. A process for obtaining banana peel syrup or juice from a banana, said method comprising providing whole, ripe bananas, each said banana comprising a banana pulp and, disposed about said banana pulp, a banana peel;

peeling said banana by hand to remove said banana pulp from within said banana peel, said banana peel comprising an outer epidermis, a chlorenchyma, and banana peel parenchyma;

placing a quantity of said banana peels into a mechanical processing device;

within said mechanical processing device, separating said banana peel parenchyma from said chlorenchyma and said outer epidermis;

homogenizing said banana peel parenchyma prior to digestion;

during said homogenizing, removing by vacuum deaeration and condensation, from said banana peel parenchyma, volatile components comprising a banana peel essence;

digesting said banana peel parenchyma with an enzyme to cause said banana peel parenchyma to evolve into a solid portion and a liquid portion, said liquid portion comprising said banana peel syrup or juice, and separating said liquid portion from said solid portion.

7. A process for obtaining banana peel essence and concentrated banana peel juice or syrup from a banana, said method comprising providing whole, ripe bananas, each said banana comprising a banana pulp and, disposed about said banana pulp, a banana peel;

peeling said banana by hand to remove said banana pulp from within said banana peel, said banana peel comprising an outer epidermis, a chlorenchyma, and banana peel parenchyma;

placing a quantity of said banana peels into a mechanical processing device;

within said mechanical processing device, separating said banana peel parenchyma from said chlorenchyma and said outer epidermis;

homogenizing said banana peel parenchyma;

during said homogenizing, recovering, by vacuum deaeration and condensation, from said banana peel parenchyma, volatile components comprising a first banana peel essence;

digesting said banana peel parenchyma with an enzyme to cause said banana peel parenchyma to evolve into a solid portion and a liquid portion, said liquid portion comprising banana peel syrup or juice;

separating said solid portion from said liquid portion; and, during said digestion, recovering, by suction and condensation, from said banana peel parenchyma, volatile components, and removing, by vacuum evaporation, from said liquid portion, further volatile components, said volatile components comprising a second banana peel essence, removal of said further volatile components thereby concentrating said liquid portion, said concentrated liquid portion comprising said concentrated banana peel juice or syrup.

8. The process of claim 4, 5, 6 or 7 comprising the further step of fermenting said banana peel juice or syrup to produce alcohol or vinegar.

9. The process of claim 4, 5, 6 or 7 comprising the further step of growing yeast employing said banana peel juice or syrup as a substrate.

10. The process of claim 1, 2, 3, 4, 5, 6. or 7 wherein said separating step includes the addition of water to facilitate flow.

11. The process of claim 1, 2, 3, 4, 5, 6 or 7 wherein said banana peel parenchyma is separated from said outer epidermis and chlorenchyma by passing said banana peels through separation means comprising screens having openings that preclude said outer epidermis and said chlorenchyma from passing through but allow said banana peel parenchyma to pass through.

12. The process of claim 11 wherein said separating step includes the addition of water to facilitate flow.

13. The process of claim 11 wherein said openings are 0.25 inch or less in diameter.

* * * * *